(No Model.)

J. W. DICKIESON.
BINDING FILE.

No. 357,375. Patented Feb. 8, 1887.

WITNESSES:
C. Neveux
G. Sedgwick

INVENTOR:
J. W. Dickieson
BY Munn & Co.
ATTORNEYS.

UNITED STATES PATENT OFFICE.

JAMES W. DICKIESON, OF BROOKLYN, NEW YORK.

BINDING-FILE.

SPECIFICATION forming part of Letters Patent No. 357,375, dated February 8, 1887.

Application filed March 22, 1886. Serial No. 195,995. (No model.)

*To all whom it may concern:*

Be it known that I, JAMES W. DICKIESON, of Brooklyn, in the county of Kings and State of New York, have invented a new and Improved Binding-File, of which the following is a full, clear, and exact description.

The object of my invention is to provide a new and improved binding-file which is simple in construction, and in which the covers can easily be detached from each other or held apart at any desired distance.

The invention consists of various parts and details and combinations of the same, as will be fully described hereinafter, and then pointed out in the claims.

Reference is to be had to the accompanying drawings, forming a part of this specification, in which similar letters of reference indicate corresponding parts in both the figures.

Figure 1:
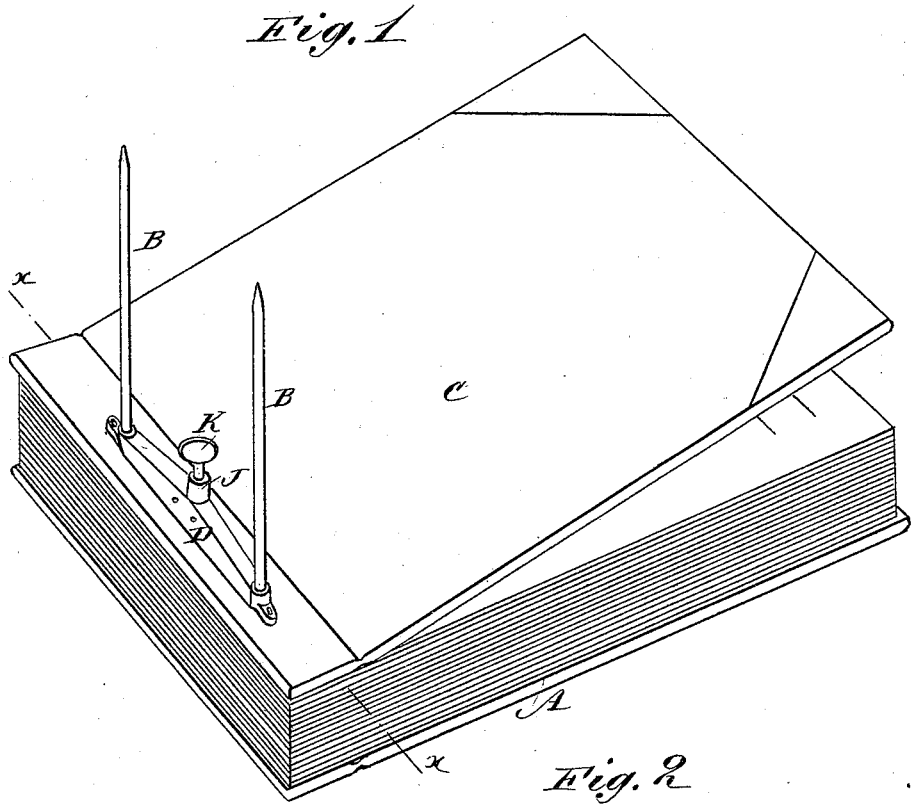
Figure 2:
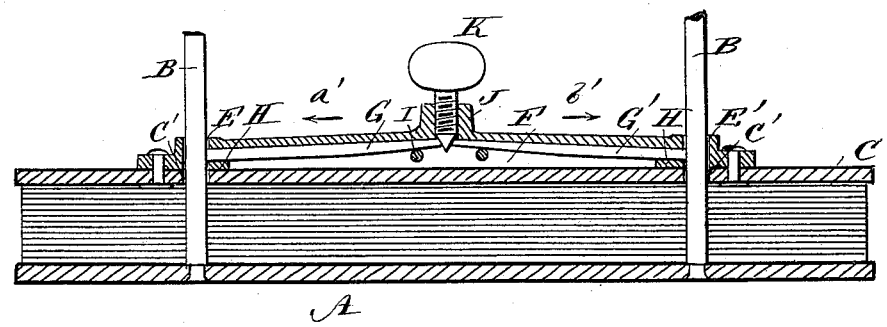

Figure 1 is a perspective view of my improvement. Fig. 2 is a vertical cross-section of the same on the line $x\ x$, Fig. 1.

The bottom cover, A, is provided near one end with two upright rods, B B, pointed on their upper ends. To the upper edge of the top cover, C, is fastened by rivets or bolts the guide-frame D, provided with apertures E E', which fit over similar apertures, C' C', in the top cover, C.

The guide-frame D has a recess, F, in which are placed the bars G and G', each held in place at one end by a bearing, H, in the guide-frame D, and near the other end by resting on a pin, I. The outer ends of the bars G and G' project into the apertures E and E', and the inner ends are slightly beveled.

In the middle of the guide-frame D is formed a boss, J, through which screws the thumb-screw K, pointed at its inner or lower end.

The operation is as follows: In order to be enabled to place additional documents on the file, or to remove documents already on the said file, it is necessary that the top cover should be removed. The documents to be filed are placed over the pointed uprights B, and pressed downward in the usual manner until they reach the cover A, or the documents already on file. The top cover, C, is then placed with its apertures C' C' and the apertures E and E' over the upright rods B, and the cover is moved downward until it touches the documents on the file. The thumb-screw K is then screwed down, so that its pointed end forces the bars G and G' outward in the direction of the arrows $a'$ and $b'$, so that their outer ends press against the upright rods B, whereby the top cover, C, is locked in place on the upright rods B.

The cover can be removed from the rods B by turning the thumb-screw K upward, which releases the bars G and G' from the upright rods, and thereby permits of the removal of the cover from the rods by lifting the cover upward, the thumb-screw K serving as a handle.

Having thus fully described my invention, I claim as new and desire to secure by Letters Patent—

1. In a binding-file, the combination, with a bottom cover provided with upright rods, of a top cover sliding on the said upright rods, clamping-bars held on the said top cover and adapted to move laterally, and means, as described, for moving the said clamping-bars in contact with the said upright rods, as set forth.

2. In a binding file, the combination of a bottom cover and upright pointed rods with a top cover having a guiding-frame provided with clamping-bars and a thumb-screw, substantially as shown and described.

3. In a binding-file, the combination of a top cover with a guiding-frame provided with clamping-bars and a thumb-screw, substantially as shown and described.

4. In a binding-file, the combination of a guiding-frame and thumb-screw with sliding bars adapted to move laterally in the guiding-frame, substantially as shown and described.

5. In a binding-file, the combination of a guiding-frame, D, having a recess, F, and apertures E and E', and provided with the pins I, with the clamping-bars G and G', slightly beveled on their ends, and the thumb-screw K, substantially as shown and described.

JAMES W. DICKIESON.

Witnesses:
THEO. G. HOSTER,
EDGAR TATE.